United States Patent
Lu et al.

(10) Patent No.: US 8,774,016 B2
(45) Date of Patent: Jul. 8, 2014

(54) ETHERNET COMMUNICATION DEVICE WITH REDUCED EMI

(75) Inventors: Litai Lu, Fremont, CA (US); Sheng Lin, Sunnyvale, CA (US); Yuwen Hsia, Saratoga, CA (US); Menping Chang, Cupertino, CA (US)

(73) Assignee: Micrel, Inc., San Jose, CA (US)

( * ) Notice: Subject to any disclaimer, the term of this patent is extended or adjusted under 35 U.S.C. 154(b) by 152 days.

(21) Appl. No.: 13/409,491

(22) Filed: Mar. 1, 2012

(65) Prior Publication Data

US 2013/0229926 A1    Sep. 5, 2013

(51) Int. Cl.
*H04L 12/66* (2006.01)

(52) U.S. Cl.
USPC ............ 370/249; 370/463; 455/260; 455/339

(58) Field of Classification Search
USPC .......................... 370/249, 463; 455/260, 339
See application file for complete search history.

(56) References Cited

U.S. PATENT DOCUMENTS

| | | | |
|---|---|---|---|
| 2005/0116741 A1* | 6/2005 | Tate .............................. | 327/100 |
| 2008/0240266 A1* | 10/2008 | Tinsley et al. ................ | 375/260 |
| 2009/0103556 A1 | 4/2009 | Naven et al. | |
| 2009/0245120 A1* | 10/2009 | Jones ............................ | 370/252 |
| 2011/0057690 A1* | 3/2011 | Akita ............................ | 327/144 |
| 2011/0103427 A1* | 5/2011 | Bafra et al. ................... | 375/130 |

* cited by examiner

*Primary Examiner* — Dang Ton
*Assistant Examiner* — Mewale Ambaye
(74) *Attorney, Agent, or Firm* — Van Pelt, Yi & James LLP (57) ABSTRACT

A network device includes a physical layer transceiver configured to receive incoming data on a data link at an input clock rate and to store the incoming data in a buffer. The physical layer transceiver includes a Media Independent Interface (MII) controller configured to receive the incoming data stored in the buffer and to transmit the incoming data over a MII bus based on a MII clock where the MII clock is a spread spectrum clock. The network device further includes a Media Access Control (MAC) device configured to receiving incoming data from the physical layer transceiver over the MII bus where the incoming data is clocked by the spread spectrum MII clock.

17 Claims, 6 Drawing Sheets

ETHERNET COMMUNICATION DEVICE WITH REDUCED EMI

FIELD OF THE INVENTION

The invention relates to data communication devices and, in particular, to an Ethernet communication device implementing spread spectrum clocking to reduce electromagnetic interference (EMI).

DESCRIPTION OF THE RELATED ART

Data communication networks, such as local area networks (LANs), are used in interconnecting network devices to facilitate data communication between two or more network devices. "Ethernet" data networks refer to data networks implementing the class of Carrier Sense Multiple Access/Collision Detection (CSMA/CD) protocols described by IEEE standard 802.3. IEEE standard 802.3 defines a number of wiring and signaling standards for the physical layer, means of network access at the Media Access Control (MAC)/Data Link Layer, and a common addressing format for Ethernet data networks. The Ethernet standard includes, among other things, the 10Base-T Ethernet which is the original Ethernet and transmits at a rate of 10 Mbit per second, the 100Base-TX Ethernet which is referred to as the Fast Ethernet and carries traffic at the nominal rate of 100 Mbit per second and the Gigabit Ethernet which transmits at a rate of 1 gigabits per second.

The physical layer of an Ethernet data communication network is the most basic network layer, providing only the means of transmitting raw bits over a physical data link connecting network nodes. The bit stream may be grouped into code words or symbols, and converted to a physical signal, which is transmitted over a physical transmission medium as the data link. The physical layer of an Ethernet communication network provides an electrical, mechanical, and procedural interface to the transmission medium. The shapes of the electrical connectors, which frequencies to broadcast on, what modulation scheme to use and similar low-level parameters are specified at the physical layer of the Ethernet communication system. In general, the Ethernet physical layer is realized in the form of a physical layer transceiver, denoted "PHY," for implementing the interfaces to transmit data over and receive data from the transmission medium. In the following description, the term "Ethernet PHY" is used to refer to the physical layer transceiver in an Ethernet data network.

A network device implementing network communication functions typically includes a physical layer transceiver receiving data from and transmitting data onto a transmission medium and a MAC device for processing incoming or outgoing data from a host processor. In operation, the network device communicates with a link partner in the LAN over the transmission medium. The host processor transmits outgoing data frames through the MAC device and the Ethernet PHY device to the transmission medium. On the other hand, the Ethernet PHY and the MAC controller receive incoming data frames from the transmission medium which are processed and transmitted to the host processor.

Most electronic devices today are equipped with a local oscillator that continuously generates a clock signal for other synchronous components to use. Most electrical components that use a local oscillator can cause the oscillator's tone to be transmitted in the form of electromagnetic interference (EMI) to other devices in the area. To prevent this interference, the FCC regulates the output power of these clocks in electronic devices. To that end, methods to lower the EMI of electronic devices have been widely adopted. In particular, spread spectrum clocking is a technique that has been applied to lower the EMI emission of electronic devices containing oscillators.

Spread spectrum clocking refers to techniques by which a clock signal having a desired clock frequency is deliberately spread in the frequency domain, resulting in a signal with a wider bandwidth. Typically, the clock signal varies continuously around the desired frequency to spread out the bandwidth of the clock signal over a broader band of frequencies centered at the desired frequency. In this manner, the power of the clock spectrum is reduced to a level acceptable by the user or under FCC regulation.

SUMMARY OF THE INVENTION

According to one embodiment of the present invention, a network device includes a physical layer transceiver configured to receive incoming data on a data link at an input clock rate and to store the incoming data in a buffer. The physical layer transceiver includes a Media Independent Interface (MII) controller configured to receive the incoming data stored in the buffer and to transmit the incoming data over a MII bus based on a MII clock where the MII clock is a spread spectrum clock. The network device further includes a Media Access Control (MAC) device configured to receiving incoming data from the physical layer transceiver over the MII bus where the incoming data is clocked by the spread spectrum MII clock.

According to another embodiment of the present invention, a physical layer transceiver configured to receive incoming data on a data link includes a buffer configured to store incoming data received at an input clock rate; and a Media Independent Interface (MII) controller configured to receive the incoming data stored in the buffer and to transmit the incoming data over a MII bus based on a MII clock where the MII clock is a spread spectrum clock.

According to yet another embodiment of the present invention, a method to reduce electromagnetic interference at a network device includes receiving incoming data at a physical layer transceiver at an input clock rate; storing the incoming data in a buffer; retrieving stored incoming data based on a buffer read clock; providing the incoming data to a Media Independent Interface (MII) controller; generating a MII clock being a spread spectrum clock; transmitting the incoming data from the MII controller onto a MII bus based on the spread spectrum MII clock; and receiving the incoming data from the MII bus at a Media Access Control (MAC) device, the MAC device operating based on a MAC clock.

The present invention is better understood upon consideration of the detailed description below and the accompanying drawings.

DETAILED DESCRIPTION OF THE PREFERRED EMBODIMENTS

In accordance with the principles of the present invention, an Ethernet network device implements spread spectrum clocking at the Media Independent Interface (MII) for connecting the Ethernet PHY to the MAC device of the network device. Reduction of EMI at the digital domain of the network device is realized. In one embodiment, a clock modulator is incorporated in the Ethernet PHY to implement the MII clock spreading scheme. Furthermore, in some embodiments, the MII spread spectrum clock is generated directly. In other embodiments, the MII spread spectrum clock is a divided down clock of a modulated buffer read clock of the Ethernet PHY. The Ethernet PHY includes an elasticity buffer to store incoming data from the transmission medium at an input clock rate and to enable the incoming data to be translated to the clock rate of the modulated buffer read clock.

Traditional EMI reduction schemes apply spread spectrum clocking to the transmission medium only. However, EMI generation at the digital processing portion of the network device has not been addressed. According to embodiments of the present invention, spread spectrum clocking scheme is applied to the MII controller of the Ethernet PHY to achieve further reduction of EMI at the network device. In embodiments of the present invention, for 10Base-T and 100Base-Tx Ethernet data networks, an elasticity buffer is placed at the 5B (5-bit) and 4B (4-bit) interface of the Ethernet PHY to synchronize incoming data between the input clock domain and the spread-spectrum clock domain. The input clock domain may be an unspread clock signal or it may be itself be a spread-spectrum clock signal. The elasticity buffer isolates the input clock signal, whether spread or unspread, from the spread-spectrum clock applied in the network device to modulate the MII clock. In other embodiments, for Gigabit Ethernet data networks, an elasticity buffer is placed between the Viterbi decoder and the PCS (physical coding sub-layer) alignment to synchronize incoming data between the input clock domain and the spread-spectrum clock domain.

Figure 1:
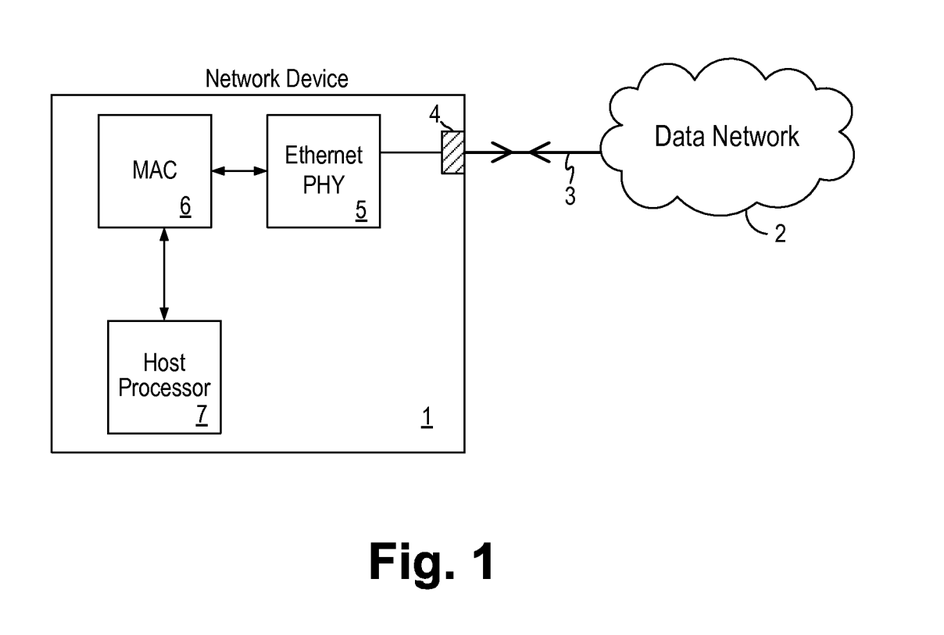
FIG. 1 is a schematic diagram of a network device according to embodiments of the present invention.

FIG. 1 is a schematic diagram of a network device according to embodiments of the present invention. Referring to FIG. 1, a network device 1 implementing network communication functions includes a connector 4 for connecting to a data link 3 being the physical transmission medium. The network device 1 communicates with one or more link partners in the data network 2 over the data link 3. The network device 1 further includes an Ethernet physical layer transceiver or an Ethernet PHY device 5 and a Medial Access Control (MAC) device 6 implementing the network interface functions. The network device may further include a host processor 7 for receiving the incoming data and generating outgoing data to the data network 2.

Figure 2:
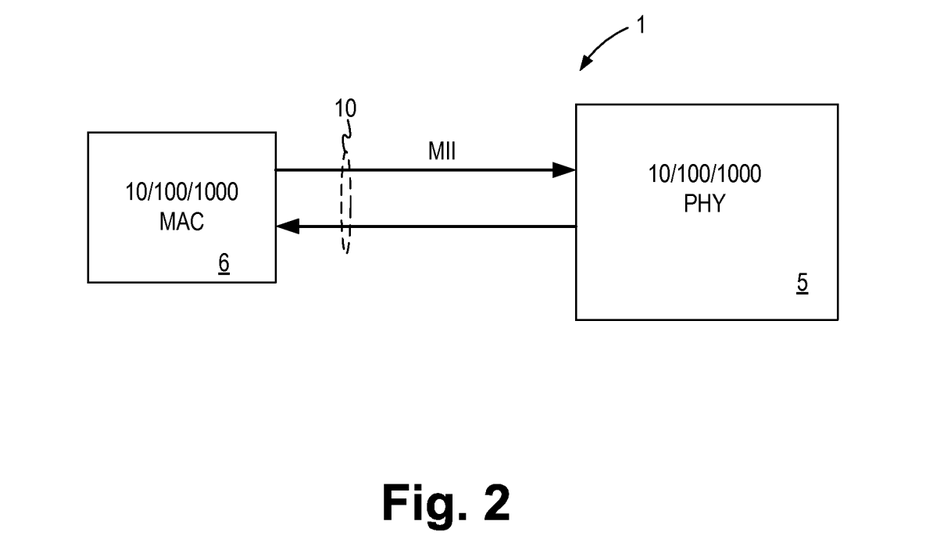
FIG. 2 illustrates the connections between the Ethernet physical layer transceiver and the MAC device in the network device according to embodiments of the present invention.

FIG. 2 illustrates the connections between the Ethernet physical layer transceiver and the MAC device in the network device according to embodiments of the present invention. The Ethernet PHY device 5 may be configured to support one or more of the 10Base-T Ethernet, the 100Base-TX Ethernet and the Gigabit Ethernet. Similarly, the MAC device 6 may be configured to support one or more of the Ethernet standards. The PHY device 5 communicates with the MAC device 6 over a Media Independent Interface (MII) bus 10. MII is a standard interface for connecting a MAC device to an Ethernet PHY device to allow different types of PHY devices to be used for connecting to different transmission media without requiring changes to the MAC device. Thus, the same MAC device can be used with any Ethernet physical layer transceiver, regardless of the transmission media being used. Under the IEEE 802.3u standard, the MII bus transfers data using 4-bit words, referred to as "nibble," in each direction. The data is clocked at 25 MHz to achieve 100 Mbits/s speed. In some cases, the Reduced Media Independent Interface (RMII) can be used to connect the physical layer transceiver to the MAC device. RMII reduces the number of signals or pins required for connected the MAC device to the physical layer transceiver.

Figure 3:
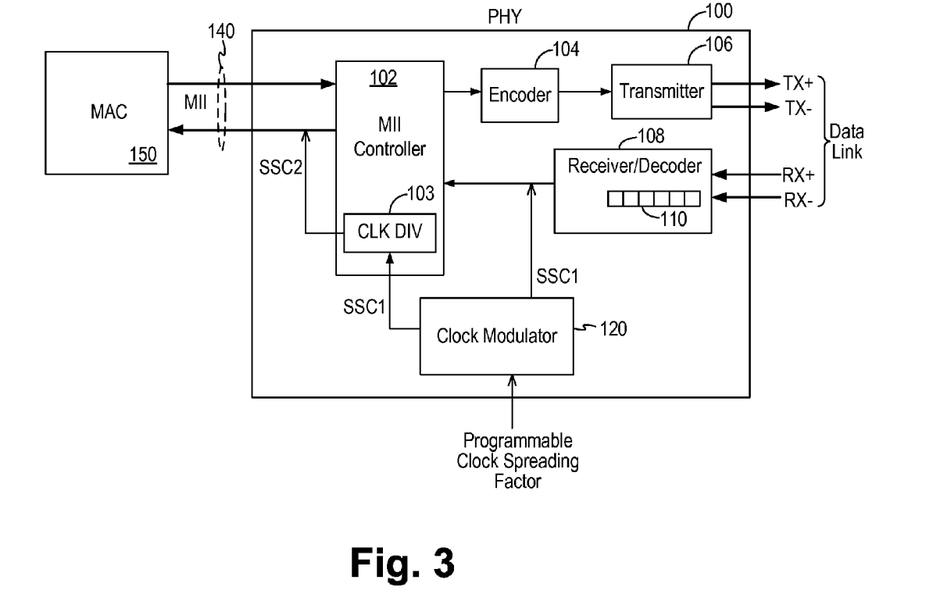
FIG. 3 is a schematic diagram of a physical layer transceiver for an Ethernet data network implementing the MII clock spreading scheme according to one embodiment of the present invention.

FIG. 3 is a schematic diagram of a physical layer transceiver for an Ethernet data network implementing the MII clock spreading scheme according to one embodiment of the present invention. Referring to FIG. 3, a physical layer transceiver 100 ("Ethernet PHY 100") is configured to communicate with a link partner over a data link and to communicate with a MAC device 150 over a MII bus 140. The Ethernet PHY 100 includes a MII controller 102 for interfacing with the MII bus 140. The MII controller 102 processes and transmits incoming data to the MAC device 150 and receives and processes outgoing data from the MAC device 150 over the MII bus 140.

The Ethernet PHY 100 includes a receiver/decoder 108 for receiving incoming data from the data link. The incoming data may be transmitted in differential signaling and is received as receive signals RX+ and RX−. The exact signaling format of the data link is not critical to the practice of the present invention. The Ethernet PHY 100 further includes an encoder 104 for encoding outgoing data to be transmitted and a transmitter 106 for transmitting the encoded outgoing data onto the data link. The outgoing data may be transmitted as transmit signals TX+ and TX− when differential signaling is used on the data link. The data transmission on the data link is clocked at an input clock rate. Meanwhile the data transmission on the MII bus is clocked at a MII clock rate. For an Ethernet data network under the IEEE standard, the input clock rate is specified at 125 MHz for 10Base-T or 100Base-TX while the MII clock rate is specified at 2.5 MHz for 10Base-T Ethernet and 25 MHz for 100Base-TX Ethernet.

According to embodiments of the present invention, the Ethernet PHY 100 implements spread spectrum clocking scheme on the MII clock of the MII bus 140. Thus, the MII clock on the MII bus 140, instead of being at the specified clock frequency under the standard, varies about the specified frequency based on a predetermined clock spreading factor. By spreading the MII clock, data transmitted from the Ethernet PHY to the MAC device on the MII bus has its frequency spread so as to reduce EMI. In this manner, EMI generated at the digital interface between the Ethernet PHY 100 and the MAC 150 is reduced.

In embodiments of the present invention, a clock modulator 120 is used to generate one or more spread spectrum clocks in the Ethernet PHY device 100. The clock modulator 120 generates the spread spectrum clock by modulating the frequency of a clock signal about a predetermined frequency based on a clock spreading factor. The clock spreading factor may be a programmable parameter provided to the clock modulator 120.

In the present embodiment, the clock modulator 120 generates a spread spectrum buffer read clock signal SSC1 for the receiver 108 which has the same clock frequency as the input clock signal. The spread spectrum buffer read clock SSC1 is used to read the data out of the receiver 108 to provide to the MII controller 102. The spread spectrum MII clock SSC2 for the MII controller 102 is derived from the spread spectrum buffer read clock signal SSC1 using a clock divider 103. That is, the spread spectrum MII clock SSC2 is a divided down clock of the spread spectrum buffer read clock SSC1. The spread spectrum MII clock SSC2 is then used to transmit data from the MII controller 102 over the MII bus 140.

As thus configured, the Ethernet PHY 100 includes an elasticity buffer 110 in the receiver 108 to synchronize the incoming data received at the input clock rate and the data being read out to the MII controller at the clock rate of the spread spectrum buffer read clock SSC1. More specifically, incoming data received by the receiver 108 is stored in the elasticity buffer 110 at the input clock rate. The MII controller 102 reads the stored data in the buffer 110 at the spread spectrum clock rate SSC1. Because the incoming data is received by the receiver 108 at a clock rate different from the clock rate at which the data is being read out of the receiver, the elasticity buffer 110 is used to prevent overflow or underflow conditions. In one embodiment, the elasticity buffer 110 is a free running buffer. In another embodiment, the elasticity buffer 110 is reset for each data packet received at the receiver 108. In embodiments of the present invention, the elasticity buffer 110 is a FIFO (first-in-first-out) memory circuit.

In the present embodiment, the spread spectrum MII clock SSC2 is generated from the spread spectrum buffer read clock SSC1 by clock division. In other embodiments, the spread spectrum MII clock SSC2 and the buffer read clock SSC1 are generated independently, such as by using separate clock modulators.

Figure 4:
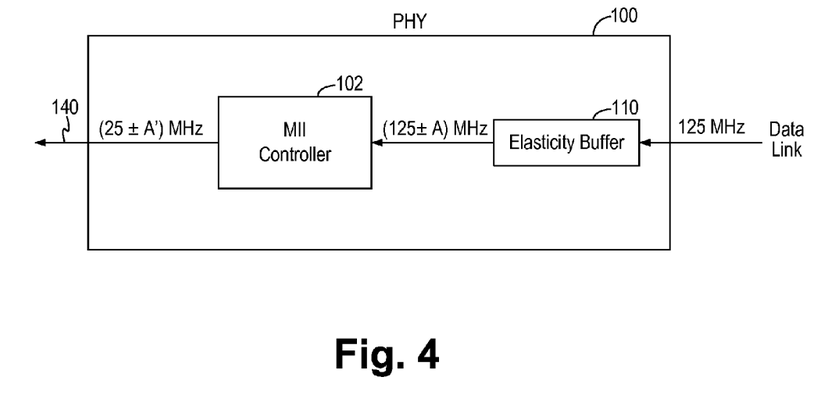
FIG. 4 illustrates the clock domains in the physical layer transceiver of FIG. 3 applying the MII clock spreading scheme according to one embodiment of the present invention.

FIG. 4 illustrates the clock domains in the physical layer transceiver of FIG. 3 applying the MII clock spreading scheme according to one embodiment of the present invention. Referring to FIG. 4, incoming data from the data link arrives at the Ethernet PHY 100 at the input clock rate of 125 MHz. The incoming data is stored in the elasticity buffer 110 at the input clock rate. The incoming data is read out of the elasticity buffer 110 at the buffer read clock rate. In the present embodiment, the buffer read clock is the modulated clock signal SSC1 generated by the clock modulator 120 (FIG. 3). More specifically, the spread spectrum buffer read clock is centered about the input clock frequency and is spread about the input clock frequency by a spreading factor of A. Thus, the spread spectrum buffer read clock runs at a frequency range of 125±A MHz. The data read out from the elasticity buffer 110 is provided to the MII controller 102 to be processed for transmission on the MII bus 140. The MII controller 102 transmits the data onto the MII bus at the spread spectrum MII clock rate. The spread spectrum MII clock rate is centered about the specified clock frequency under the standard which is 2.5 MHz for 10Base-T Ethernet and 25 MHz for 100Base-TX Ethernet. In the present embodiment, it is assumed that the MII controller 102 is configured for 100Base-TX Ethernet. The MII clock is 25 MHz and varies about the 25 MHz clock frequency by a given spreading factor. In the present illustration, the spread spectrum MII clock is a divided down clock of the spread spectrum buffer read clock signal SSC1. Thus, the spread spectrum MII clock runs at a frequency range of 25±A' MHz, where A' is the divided down spreading factor of the spreading factor A. In other embodiments, the spread spectrum MII clock can be generated directly and has a frequency range of 25±C MHz, where C is the spreading factor of the spread spectrum MII clock. In this manner, the data transmitted on the MII bus is spread over a given frequency range to reduce EMI on the digital data bus.

In embodiments where the MII controller 102 is configured for 10Base-T Ethernet, the MII clock is 2.5 MHz and the spread spectrum MII clock has a frequency range of 2.5±A' MHz when the spread spectrum MII clock is a divided down clock and 2.5±C MHz when the spread spectrum MII clock is generated directly.

Figure 5:
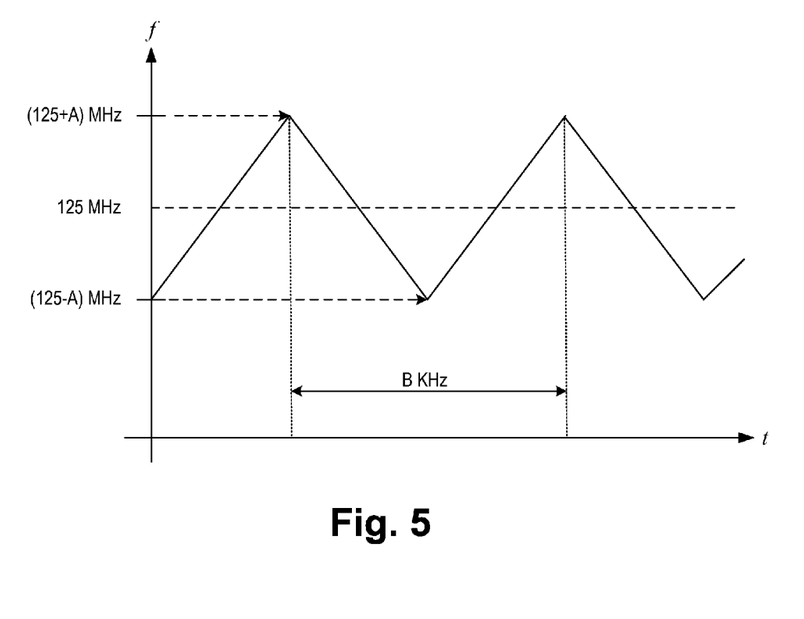
FIG. 5 is plot of the spread spectrum buffer read clock according to one embodiment of the present invention.

FIG. 5 is plot of the spread spectrum buffer read clock according to one embodiment of the present invention. Referring to FIG. 5, the buffer read clock is centered about the input clock frequency which is 125 MHz and the buffer read clock is spread between 125+A MHz and 125−A MHz frequency range. In the present embodiment, the positive and negative frequency excursion range is the same so that the frequency spread is ±A about the 125 MHz desired frequency. In other embodiments, the positive and negative frequency excursion range may be different. That is, the spread spectrum buffer read clock may be spread between 125+A1 MHz and 125−A2 MHz frequency range, where A1≠A2. The spreading factor A is selected to realize sufficient amount of EMI reduction.

In embodiments of the present invention, the modulation frequency of the spread spectrum clock, that is how fast the frequency modulation is changing, is B kHz. In some embodiments, the modulation frequency is 30-50 kHz to avoid audio band demodulation and to minimize system timing skew.

In FIG. 5, spreading of the 125 MHz buffer read clock is described. The spread spectrum buffer read clock is then divided down to generate the spread spectrum MII clock. It is understood that the MII clock can be spread directly in the same manner to generate the spread spectrum MII clock.

In embodiments of the present invention, implementation of the MII clock spreading scheme at the physical layer transceiver does not require any modifications to the MAC device to which the physical layer transceiver is coupled. This is because the MAC device inherently includes input buffer for receiving incoming data on the MII bus. As long as the input buffer of the MAC has sufficient buffer depth, the MAC device can receive incoming data at the spread spectrum MII clock rate and overflow or underflow condition at the MAC device is avoided.

Figure 6:
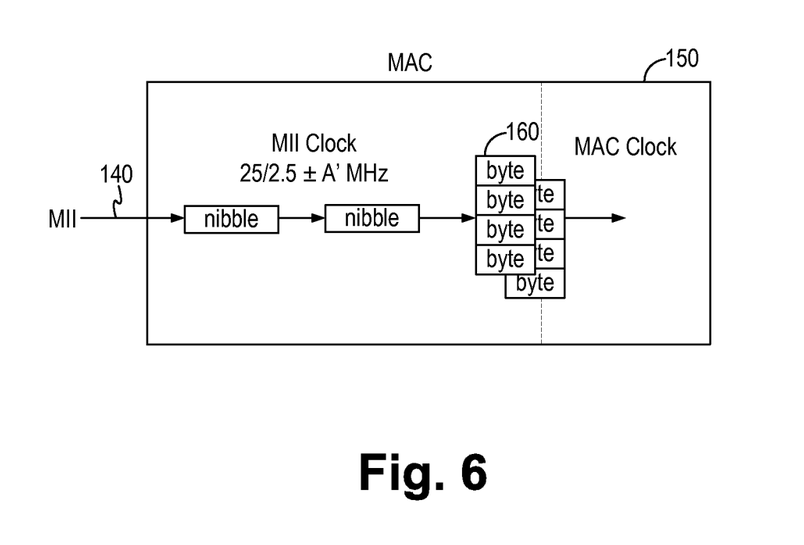
FIG. 6 illustrates clock domains and the input buffer of a MAC device which can be used to communicate with the Ethernet PHY implementing MII clock spreading scheme according to embodiments of the present invention.

FIG. 6 illustrates clock domains and the input buffer of a MAC device which can be used to communicate with the Ethernet PHY implementing MII clock spreading scheme according to embodiments of the present invention. Referring to FIG. 6, a MAC device 150 includes input buffer 160 configured to store bytes (8-bit) of input data. The MAC device 150 receives input data on the MII bus 140 in the form of nibbles (4-bit) and at the spread spectrum MII clock rate. The nibbles of data are stored in the input buffer 160. The MAC device 150 reads the stored data out of input buffer 160 at a MAC clock rate. However, because the MAC device 150 does not read the data out of the input buffer 160 until at least a byte is stored, the MAC clock rate is at least about half of the MII clock rate. In some applications, the MAC device 150 reads out the stored data only after 4 bytes of data have been received. Therefore, as long as the input buffer 160 has sufficient buffer depth, modulation of the MII clock will generally not cause any overflow or underflow condition to occur.

Figure 7:
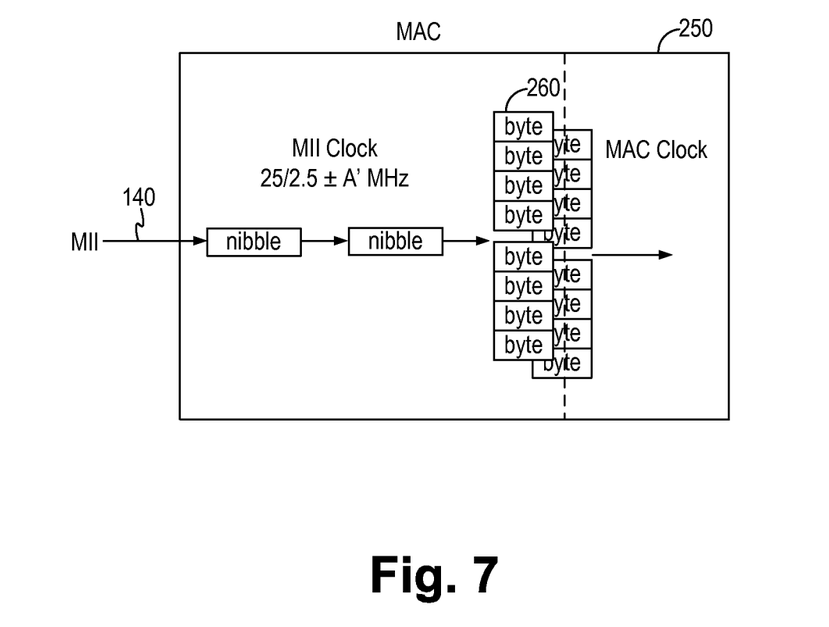
FIG. 7 illustrates clock domains and the input buffer of a MAC device which can be used to communicate with the Ethernet PHY implementing MII clock spreading scheme according to alternate embodiments of the present invention.

FIG. 7 illustrates clock domains and the input buffer of a MAC device which can be used to communicate with the Ethernet PHY implementing MII clock spreading scheme according to alternate embodiments of the present invention. In applications based on the Gigabit Ethernet, a MAC device 250 may include a larger input buffer 260 to store the input data. When the depth of the input buffer 260 is large, the incoming nibbles of input data, arriving at a spread spectrum MII clock rate, may be stored in the input buffer 260 without causing overflow or underflow condition.

In embodiments of the present invention, a data integrity detection scheme is implemented to ensure that correct data reception at the MAC device when the MII clock is spread. The data integrity detection scheme can also be used to determine the depth of the input buffer in the MAC device and the maximum amount of clock spreading that can be tolerated by the MAC device. In some embodiments, the data integrity detection scheme is implemented by programming one or more sets of registers in the Ethernet PHY device or the MAC device.

Figure 8:
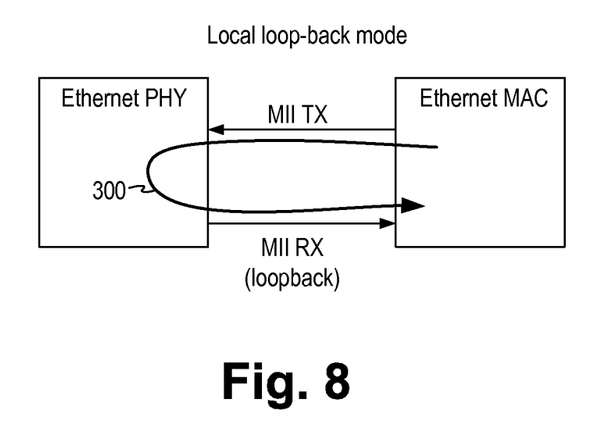
FIG. 8 illustrates the operation of the local loop-back mode between an Ethernet PHY implementing the MII clock spreading and a MAC device according to embodiments of the present invention.

In one embodiment, the data integrity detection scheme realizes a local loop-back mode to determine the maximum MII clock spreading that can be applied. FIG. 8 illustrates the operation of the local loop-back mode between an Ethernet PHY implementing the MII clock spreading and a MAC device according to embodiments of the present invention. In the local loop-back mode, a MAC device sends a test data packet to the Ethernet PHY. In the Ethernet PHY, the register MII reg0.14 is programmed into a local loop-back mode. Thus, the test data packet sent by the MAC device is loop back and returned to the MAC device, as represented by a loop back path 300. The MAC device verifies the data received on the loop back for correctness. The clock spreading factor is varied while applying the local loop-back mode and the maximum amount of MII clock spreading can then be determined based on comparison of the test data packet from the local loop-back.

Figure 9:
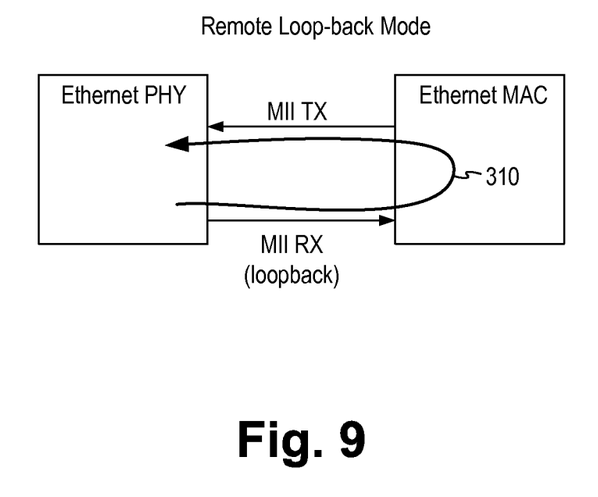
FIG. 9 illustrates the operation of the remote loop-back mode between an Ethernet PHY implementing the MII clock spreading and a MAC device according to embodiments of the present invention.

In another embodiment, the data integrity detection scheme realizes a remote loop-back mode to determine the maximum MII clock spreading that can be applied. FIG. 9 illustrates the operation of the remote loop-back mode between an Ethernet PHY implementing the MII clock spreading and a MAC device according to embodiments of the present invention. In the remote loop-back mode, an Ethernet PHY device sends a test data packet to the MAC device. The MAC device is programmed to loop back and returned the test data packet to the Ethernet PHY, as represented by a loop back path 310. The Ethernet PHY device verifies the data received on the loop back for correctness. The clock spreading factor is varied while applying the remote loop-back mode and the maximum amount of MII clock spreading can then be determined based on comparison of the data from the remote loop-back.

By choosing the appropriate clock spreading factor, sufficient EMI reduction can be realized. In some embodiments, with the spreading factor of A up to 2 MHz, a peak EMI power reduction of up to 10 dB can be obtained.

Figure 10:
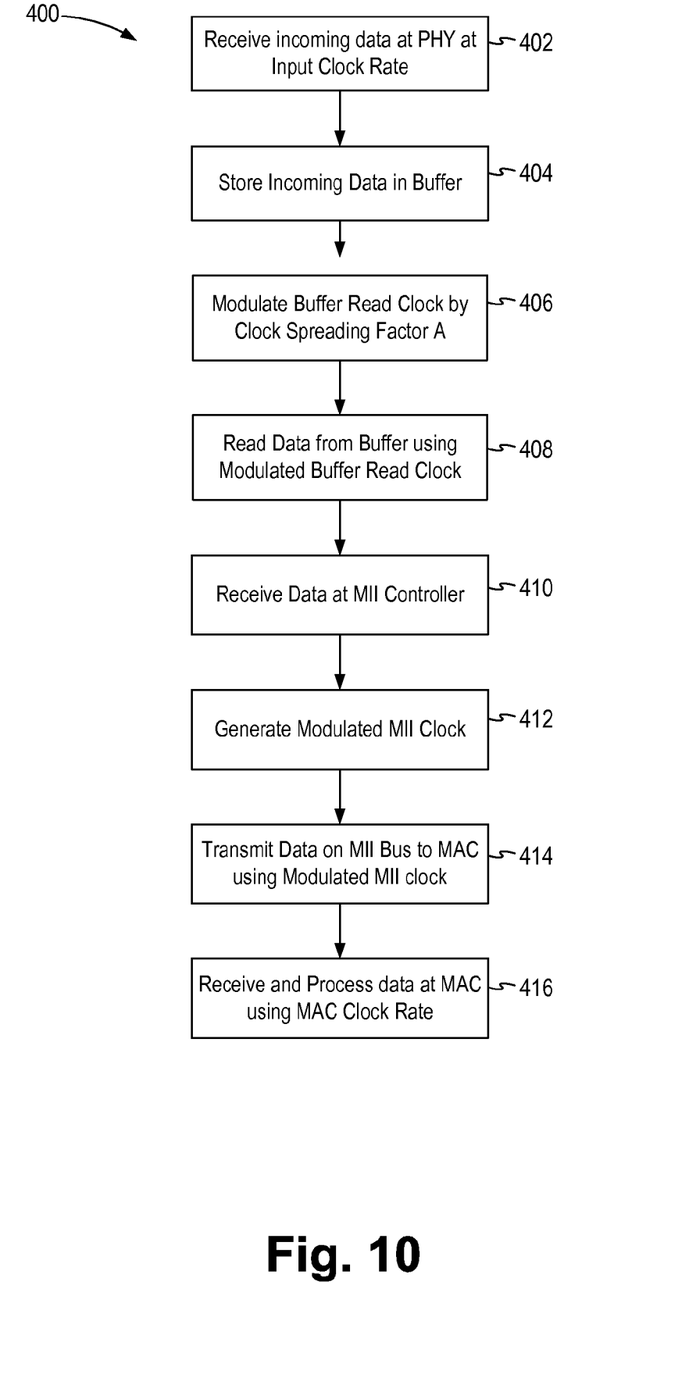
FIG. 10 is a flow chart illustrating the MII clock spreading scheme according to one embodiment of the present invention.

FIG. 10 is a flow chart illustrating the MII clock spreading scheme according to one embodiment of the present invention. Referring to FIG. 10, incoming data is received at the Ethernet PHY at the input clock rate (step 402). The incoming data is stored in the elasticity buffer (step 404). A buffer read clock is modulated by the clock spreading factor A (step 406). The data is read out of the elasticity buffer using the modulated buffer read clock (step 408). The data is received by the MII controller (step 410). A modulated MII clock is generated (step 412). In one embodiment, the modulated MII clock is generated by dividing down the modulated buffer read clock. In another embodiment, the modulated MII clock is generated directly by varying the frequency of the specified MII clock. The MII controller uses the modulated MII clock to transmit data on a MII bus to the MAC device (step 414). The MAC device receives and processes the incoming data at the MAC clock rate (step 416).

The above detailed descriptions are provided to illustrate specific embodiments of the present invention and are not intended to be limiting. Numerous modifications and variations within the scope of the present invention are possible. The present invention is defined by the appended claims.

We claim:

1. A network device comprising: a physical layer transceiver configured to receive incoming data on a data link at an input clock rate and to store the incoming data in a buffer at the input clock rate, the physical layer transceiver comprising a Media Independent Interface (MII) controller configured to read out the incoming data stored in the buffer based on a buffer read clock being a spread spectrum clock having a first clock spreading factor and to transmit the incoming data over a MII bus based on a MII clock, the MII clock being a spread spectrum clock having a second clock spreading factor different from the first clock spreading factor; and a Media Access Control (MAC) device configured to receive incoming data from the physical layer transceiver over the MII bus, the incoming data being clocked by the spread spectrum MII clock; wherein the physical layer transceiver is configured to communicate with the MAC device over the MII bus using the Media Independent Interface controller to interface with the MII bus, the Media Independent Interface controller being configured to process and transmit incoming data to the MAC device, the incoming data being transmitted from the MII controller to the MAC device using the spread spectrum MII clock.

2. The network device of claim 1, wherein the buffer comprises a FIFO (first-in-first-out) memory circuit.

3. The network device of claim 1, wherein the spread spectrum MII clock is a divided down clock of the spread spectrum buffer read clock, and the second clock spreading factor is a divided down clock spreading factor of the first clock spreading factor.

4. The network device of claim 3, further comprising a clock modulator circuit configured to generate the spread spectrum buffer read clock having the first clock spreading factor.

5. The network device of claim 4, wherein the first clock spreading factor is programmable.

6. The network device of claim 1, further comprising a clock modulator circuit configured to generate the spread spectrum MII clock having the second clock spreading factor.

7. The network device of claim 6, wherein the second clock spreading factor is programmable.

8. The network device of claim 1, wherein the MII clock is spread based on the second clock spreading factor and the MAC device is configured to send a test data packet to the physical layer transceiver and the physical layer transceiver is configured to return the test data packet to the MAC device for verification, the second clock spreading factor being adjusted based on the correctness of the test data packet being returned.

9. The network device of claim 1, wherein the MII clock is spread based on the second clock spreading factor and the physical layer transceiver is configured to send a test data packet to the MAC device and the MAC device is configured to return the test data packet to the physical layer transceiver for verification, the second clock spreading factor being adjusted based on the correctness of the test data packet being returned.

10. A physical layer transceiver configured to receive incoming data on a data link and to transmit the incoming data over a Media Independent Interface (MII) bus to a Media Access Control (MAC) device, the physical layer transceiver comprising: a buffer configured to store incoming data received at an input clock rate; and a Media Independent Interface (MII) controller configured to read out the incoming data stored in the buffer based on a buffer read clock being a spread spectrum clock having a first clock spreading factor and to transmit the incoming data over a MII bus based on a MII clock, the MII clock being a spread spectrum clock having a second clock spreading factor different from the first clock spreading factor, wherein the physical layer transceiver is configured to communicate with the MAC device over the MII bus using the Media Independent Interface controller to interface with the MII bus, the Media Independent Interface controller being configured to process and transmit incoming data to the MAC device, the incoming data being transmitted from the MII controller to the MAC device using the spread spectrum MII clock.

11. The physical layer transceiver of claim 10, wherein the spread spectrum MII clock is a divided down clock of the spread spectrum buffer read clock, and the second clock spreading factor is a divided down clock spreading factor of the first clock spreading factor.

12. The network device of claim 11, further comprising a clock modulator circuit configured to generate the spread spectrum buffer read clock having the first clock spreading factor.

13. The network device of claim 12, wherein the first clock spreading factor is programmable.

14. A method to reduce electromagnetic interference at a network device, comprising: providing a physical layer transceiver configured to communicate with a Media Access Control (MAC) device over a Media Independent Interface (MII) bus using a Media Independent Interface (MII) controller to interface with the MII bus; receiving incoming data at a physical layer transceiver at an input clock rate; storing the incoming data in a buffer of the physical layer transceiver at the input clock rate; reading out stored incoming data based on a buffer read clock being a spread spectrum clock having a first clock spreading factor; providing the incoming data to the Media Independent Interface (MII) controller of the physical layer transceiver, the Media Independent Interface controller being configured to process and transmit the incoming data to the MAC device; generating a MII clock being a spread spectrum clock having a second clock spreading factor different from the first clock spreading factor; transmitting the incoming data from the MII controller onto the MII bus based on the spread spectrum MII clock; and receiving the incoming data from the MII bus at a Media Access Control (MAC) device, the MAC device operating based on a MAC clock.

15. The method of claim 14, wherein generating a MII clock being a spread spectrum clock comprises generating the MII clock being a divided down clock of the spread spectrum buffer read clock, and the second clock spreading factor is a divided down clock spreading factor of the first clock spreading factor.

16. The method of claim 14, further comprising: sending a test data packet from the MAC device to the physical layer transceiver; returning the test data packet from the physical layer transceiver to the MAC device; verifying the returned test data packet; and adjusting the second clock spreading factor of the spread spectrum MII clock based on the correctness of the test data packet being returned.

17. The method of claim 14, further comprising: sending a test data packet from the physical layer transceiver to the MAC device; returning the test data packet from the MAC device to the physical layer transceiver; verifying the returned test data packet; and adjusting the second clock spreading factor of the spread spectrum MII clock based on the correctness of the test data packet being returned.

* * * * *